United States Patent [19]

Mikel et al.

[11] 4,289,048
[45] Sep. 15, 1981

[54] LOCK-UP SYSTEM FOR TORQUE CONVERTER

[75] Inventors: Steve A. Mikel; Alfred P. Blomquist, both of Farmington Hills, Mich.

[73] Assignee: Chrysler Corporation, Highland Park, Mich.

[21] Appl. No.: 940,934

[22] Filed: Sep. 11, 1978

[51] Int. Cl.³ .................. F16H 3/44; F16D 33/00; F16D 35/00
[52] U.S. Cl. .................. 74/733; 192/3.29; 192/3.34; 192/3.33
[58] Field of Search ............ 192/3.29, 3.34, 3.33; 74/733

[56] References Cited

U.S. PATENT DOCUMENTS

| | | | |
|---|---|---|---|
| 2,756,616 | 7/1956 | Forster | 192/3.33 X |
| 3,073,179 | 1/1963 | Christenson | 74/733 |
| 3,189,144 | 6/1965 | Gabriel | 192/3.29 |
| 3,239,037 | 3/1966 | Crosswhite et al. | 192/3.33 |
| 3,252,352 | 5/1966 | General et al. | 192/3.29 |
| 3,505,907 | 4/1970 | Fox et al. | 192/3.29 X |
| 3,631,744 | 1/1972 | Blomquist | 74/868 |
| 3,638,771 | 2/1972 | Chana | 192/3.33 |
| 3,691,872 | 9/1972 | Schaefer | 74/731 |
| 3,810,531 | 5/1974 | Edmunds | 74/733 |
| 3,814,221 | 6/1974 | Fuehrer | 192/3.34 |
| 3,977,502 | 8/1976 | Chana | 74/733 X |
| 4,027,757 | 6/1977 | Radke | 192/3.29 |
| 4,051,932 | 10/1977 | Arai et al. | 74/733 |
| 4,090,417 | 5/1978 | Burcz et al. | 74/733 |
| 4,095,486 | 6/1978 | Ohnuma | 74/733 |
| 4,138,003 | 2/1979 | Malloy | 192/3.29 |
| 4,143,561 | 3/1979 | Melhorn | 74/730 |

Primary Examiner—Leslie Braun
Attorney, Agent, or Firm—Newtson & Dundas

[57] ABSTRACT

A lock-up system for an automatic transmission torque converter including a single movable piston disposed axially between a housing fixed to the torque converter impeller and the torque converter turbine, normally held in a free position by transmission regulated fluid forces and movable in response to a reversal of the fluid forces acting on it to a position where frictional sealing surfaces on the piston and the housing effect a mechanical interconnection of the turbine and impeller.

9 Claims, 4 Drawing Figures

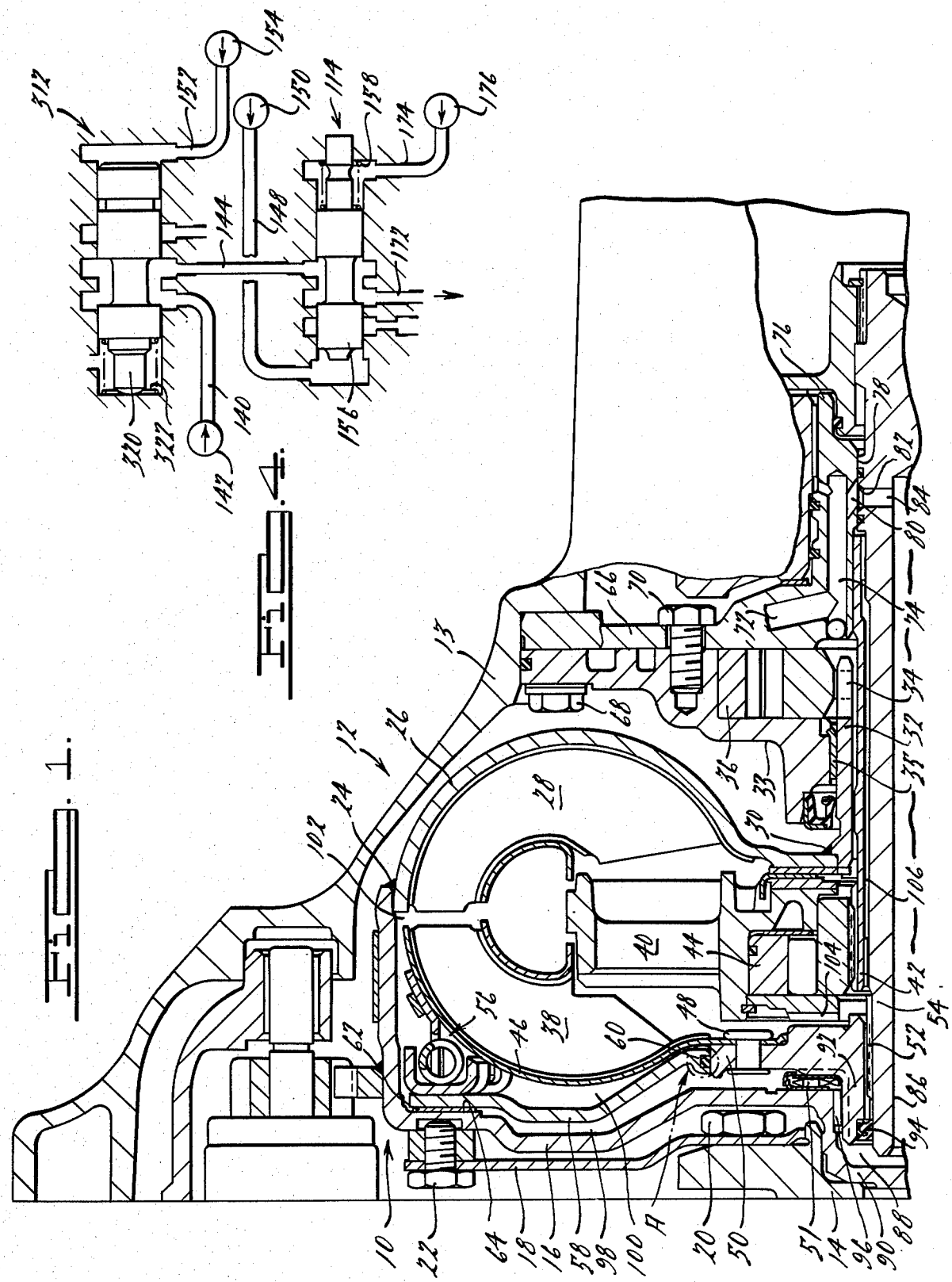

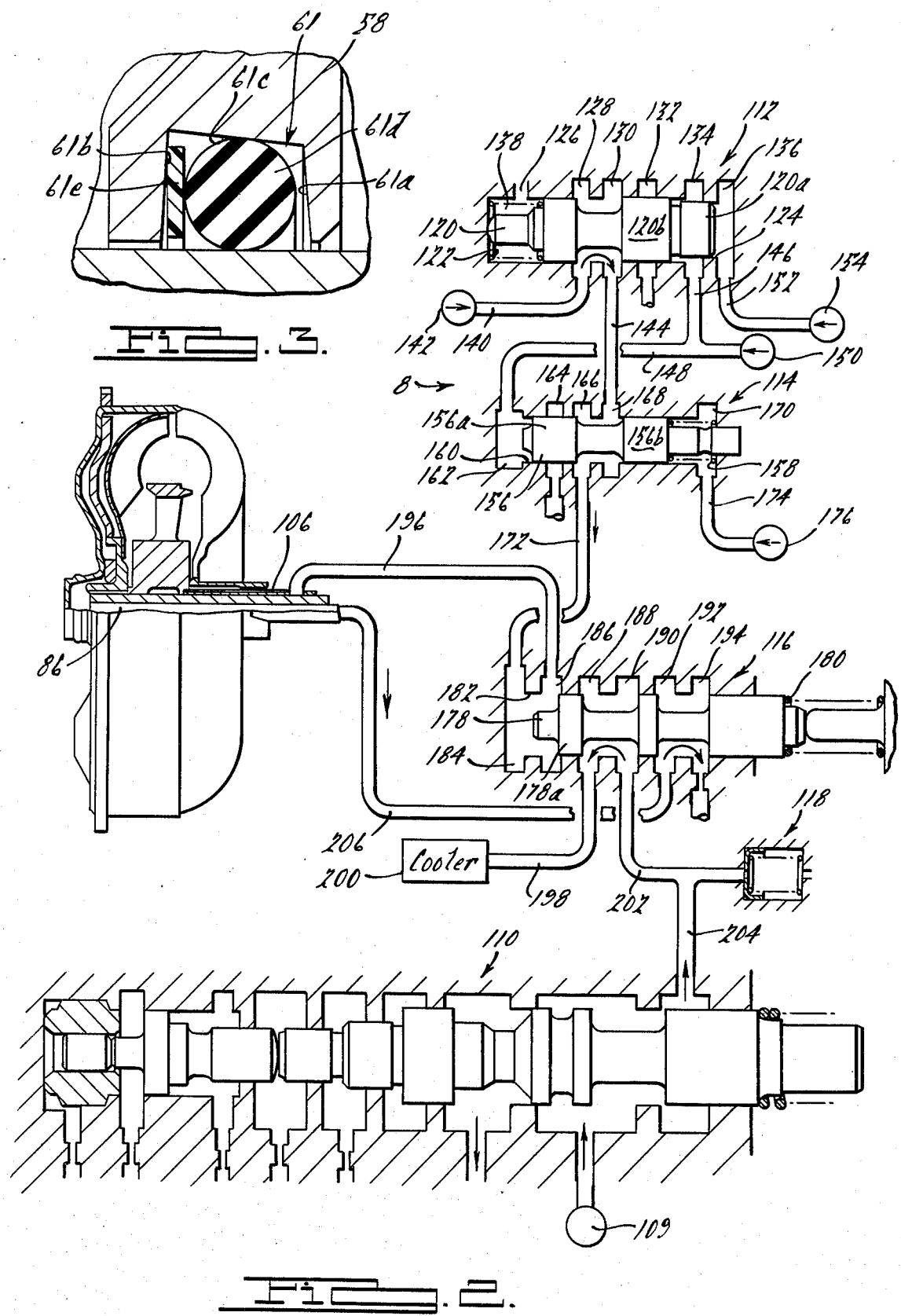

LOCK-UP SYSTEM FOR TORQUE CONVERTER

BACKGROUND OF THE INVENTION

1. Field of Invention

This invention relates generally to torque converters and lock-up clutch systems therefor.

2. Description of the Prior Art

In using automatic transmissions having torque converters in automotive vehicular applications, it has long been known that reductions in power loss and resulting improvements in fuel economy at cruising speeds might be realized if the torque converter's relatively rotatable impeller and turbine might be mechanically interconnected during these operating conditions. Unfortunately, lock-up clutch systems heretofore employed to effect such interconnection have been objectionably complex and expensive. Some have also adversely affected transmission shift quality or have failed to effect smooth transition to the mechanically interconnected mode of operation.

SUMMARY OF THE INVENTION

Responsive to the cited deficiencies in the prior art, the present invention provides a torque converter lock-up clutch system for an automatic transmission that is relatively simple, employing a minimal number of parts, and which smoothly effects engagement in the lock-up mode without affecting operation of the transmission in other modes of operation. According to one feature of the invention, a pressure responsive piston is carried with the torque converter turbine which is movable between a free position wherein relative rotational movement between the turbine and its associated impeller is permitted and a frictionally locked position wherein such movement is prevented in response solely to a difference in pressure across the piston.

According to another feature, frictional locking means are employed which are operative to provide for the release of pressurized fluid from one side of the movable piston.

According to yet another feature, improved sliding seal means are provided to minimize engine torsional vibrations passing therethrough and for insuring freedom of the piston to move between its free and frictionally locked positions.

According to still another feature, valve means are provided which are operative in one condition to permit operation of the torque converter in its normal modes of operation and in another condition to permit operation of the torque converter in the locked up mode of operation.

According to still another feature, other valve means are provided for permitting operation of the torque converter during only certain modes of transmission operation.

These and other features will become obvious to those skilled in the automatic transmission and torque converter art upon reading the following detailed description with reference to the accompanying drawings.

BRIEF DESCRIPTION OF THE DRAWINGS

FIG. 1 is a detailed partial cross sectional view of an automatic transmission embodying the torque converter lock-up system of the present invention.

FIG. 2 is a diagrammatic view of the relevant portion of an hydraulic control circuit of an automatic transmission employing the torque converter lock-up system of the present invention.

FIG. 3 is an enlarged view of a portion of FIG. 1 indicated by the circled labeled "A" therein.

FIG. 4 is a partial diagrammatic view of an alternative configuration of the control circuit of FIG. 1.

DESCRIPTION OF THE PREFERRED EMBODIMENT

1. The Lock-up Mechanism

Referring now to the drawings and in particular to FIG. 1, the torque converter lock-up clutch 10 of the present invention is illustrated as being installed in the torque converter portion 12 of an automatic transmission. The illustrated transmission is of the type described in U.S. Pat. No. 3,631,744 incorporated herein by reference, assigned to the assignee of the present invention, but it will be clear to those skilled in the art that other automatic transmissions employing hydrokinetic torque converters might alternatively be utilized in practicing the invention claimed.

The torque converter portion 12 of the transmission is operative to transmit power from a prime mover such as an automobile engine (not shown) to the change speed gear box (not shown) of the transmission 12 from where it is transmitted to a drive unit (not shown) such as the final wheel drive of an automobile.

Power is transmitted from the crankshaft 14 of the engine to a front cover member 16 of the transmission through a plate member 18. Plate member 18 is secured proximate its inner periphery to the crankshaft 14 by suitable features such as bolts 20 and is likewise secured proximate its outer periphery to the cover member 16 by suitable fastening means such as bolts 22. The cover member 16 is secured, as by welding at 24, to a shell portion 26 of the impeller assembly 28 of the torque converter portion 12 of the transmission. The shell portion 26, in turn, is secured, as by welding at 30, to a pump drive shaft 32, which is drivingly engaged at 34 to a suitable well-known positive displacement pump 36 from which fluid is supplied the torque converter portion 12 in a manner to be described herein. The shaft 32 is supported in a housing 33 through a bearing member 35.

The impeller 28 is fluidly connected in toroidal flow relationship in a known manner with a turbine assembly 38 and a stator assembly 40. The stator assembly 40 is connected to a stationary reaction shaft member 42 through a known one-way clutch assembly 44 which permits rotation only in the direction of the impeller 28. The turbine assembly 38 includes a shell portion 46 which is secured by rivets 48 or the like to a turbine hub member 50 which is drivingly connected, as by a splined connection 52, to an input shaft 54, by which the change speed gear box (not shown) of the transmission is drivingly engaged. The hub member 50 is perferably spaced from the front cover 16 by an antifriction member such as the roller bearing illustrated at 51. Also connected to the shell portion 46 of the turbine 38, is a portion of a torsional isolation mechanism 56, which is similarly connected to an annular piston member 58. The piston member 58 is slidingly and sealingly mounted for axial movement on an outer diameter of the turbine hub member 50 through sealing means 60 to be later described in more detail. An annular disc shaped frictional element 62 is carried proximate the outer periphery of the cover member 16 for engagement with a cooperating annular surface 64 of the piston member 58 under conditions to be hereafter described.

Still referring to FIG. 1, fluid communication between the components of the torque converter portion 12 heretofore described is effected in the following manner:

The pump housing 33 is secured to the case 13 of the transmission and to a port plate 66 by fasteners such as bolts 68, 70. Fluid communication with a source of pressurized fluid in the control circuit of FIG. 2 to be later described is effected through a passage 72 formed in the plate 66. The passage 72 intersects a rearward extending passage 74 formed in a hollow, rearwardly extending hub portion 76 which rotatively receives the input shaft 54 on an inner diameter 78 formed therethrough. A passage 80 intersects the passage 74, extending radially inwardly through the hub portion 76 and axially registering with an annular groove 82 formed in the outer periphery of the input shaft 54. A radially inwardly extending passage 84 extends from the groove 82 to an inner bore 86 which extends frontwardly to the end of the input shaft 54. The bore 86 is then in communication with a pocket 88 formed in a closed end 90 of the front cover member 16. Fluid communication with the annular space 92 between the input shaft 54 and the turbine hub member 50 is prevented by a static seal 94. Fluid communication is permitted, then, only through axial grooves 96 in a bushing carried between the hub member 50 and the cover member 16, through the bearing 51, and then to a chamber 98 formed between the front cover member 16 and the piston member 58.

Another chamber 100 is defined between the turbine shell 46 and the piston member 58. It is in communication with the chamber 98 when surfaces 62 and 64 are disengaged and is in continuous communication with the turbine and impeller 38, 28 through a gap 102 between the shells 26, 46.

This discharge side of the turbine 38 is communicated through slots 104 with an annular passage 106 formed by radial clearance between the input shaft 54 and stationary reaction shaft 42. The passage 106 is communicated through a path similar to that described between passage 72 and bore 86 with the control circuit of FIG. 2.

2. The Control Circuit

Turning now to FIG. 2, a control circuit 8 is diagrammatically illustrated as it fluidly interacts with the torque converter portion 12 of the transmission and a known pressure regulating valve 110 and other fluid pressure sources of the type used in automatic transmissions such as that disclosed in the above mentioned U.S. Pat. No. 3,631,744. The control circuit comprises, in general, a lock-up valve 112, a selector valve 114, a switch valve 116, and a protective relief valve 118.

The lock-up valve 112 is illustrated as a three landed spool 120 biased rightward as viewed in FIG. 2 by a spring 122 in a stepped bore 124 about which six communication passages 126, 128, 130, 132, 134, 136 are formed. Passage 126 vents the spring chamber 138 of the valve 112 to a reservoir (not shown) of the transmission. Passage 128 communicates with a conduit 140 which is connected to a source 142 of fluid at "line pressure", outlet pressure of a positive displacement pump such as pump 36 in the transmission. Passage 130 communicates with a conduit 144 which is in communication with the selector valve 114. Passage 132 is in communication with the transmission reservoir or vent (not shown). Passage 134 communicates with a conduit 146 which in turn communicates with a passage 148 interconnecting a source 150 of pressurized fluid in the transmission indicative of the selection or lack thereof of third gear operation in the transmission. In a transmission of the type described in the above mentioned U.S. Pat. No. 3,631,744, the pressure supplied would be the release pressure of the kickdown servo actuator.

Passage 136 communicates with a passage 152 connected to a source 154 of pressure regulated by the governor of the transmission, which pressure varies exponentially with vehicle speed.

Turning next to the selector valve 114, it is likewise illustrated as a three landed spool 156. It is biased leftward by a spring 158 and is received in a bore 160 about which five annular passages 162, 164, 166, 168 and 170 are formed. Passage 162 communicates directly with the previously described conduit 148 and thence to the source 150 of kickdown servo release pressure. Passage 164 communicates with the transmission reservoir or vent (not shown). Passage 166 communicates with a conduit 172 interconnecting the selector valve 114 and a portion of the switch valve 116. Passage 168 communicates with the previously described passage 144 and the lock-up valve 112. Passage 170 communicates with a conduit 174 which is connected to a source 176 of fluid at a pressure regulated by the throttle position and thus power demand (referred to as "throttle pressure") of the engine to which the transmission is coupled.

Turning next to the switch valve 116, it is illustrated in its preferred configuration as a three landed spool 178 biased leftward by a spring 180 in a bore 182 about which six annular passages 184, 186, 188, 190, 192 and 194 are formed. Passage 184 communicates with the selector valve 114 through previously described conduit 172. Passage 186 communicates with a conduit 196 which communicates at its other end with the annular passage 106 formed between the input shaft 54 and the stationary shaft 42 of the torque converter portion 12 of the transmission. Passage 188 communicates with a conduit 198 which is connected at its other end with a cooler 200 carried preferably in the radiator of the vehicle. Passage 190 communicates with a conduit 202 which is connected to the relief valve 118 whereby operating pressure of the torque converter portion 12 is limited to a safe level and to a branch conduit 204 which is supplied with pressure regulated fluid by the pressure regulator 110, which is connected to a source 109 of "line pressure". Passage 192 communicates with a conduit 206 which is connected at its other end to the inner bore 86 of the transmission input shaft 54. Passage 194 vents the bore 182 to a reservoir (not shown) of the transmission.

3. Operation of the Preferred Embodiment

In FIGS. 1 and 2, the lock-up clutch mechanism 10 and the control circuit 8 are illustrated with all components thereof in the positions assumed during the lock-up mode of operation. The valves of the control circuit are arranged in a logical sequence requiring that certain operational conditions be met for the valves to take the described positions 8.

For the lock-up valve spool 120 to move full leftward as shown the force exerted on the right land 120a by governor pressure plus that exerted on the unbalanced portion of the center land 120b must exceed the rightward force exerted by the spring 122. This will normally occur when the vehicle is in a direct drive condition; i.e., in third gear in a typical three speed automatic transmission, and has obtained a predetermined minimum speed such as 27 miles per hour. Thus, two additive signals are required to shift the spool 120.

The kickdown servo pressure indicative of third gear operation in conduit 148 is also transmitted to the left land 156a of selector valve spool 156. Until this pressure reaches some minimum level indicating that a down shift to second gear is impending, the rightward force exerted thereby is sufficient to overcome the biasing force of the spring 158 and the force exerted by throttle pressure on center land 156b. This valve operation ensures that the valves of control circuit 8 can assume the illustrated lock-up position only when the transmission is securely in third gear, since kickdown servo pressure below the predetermined minimum will result in shifting the spool 156 leftward to block communication with the conduit 144. This will, of course, occur as a steady state condition any time that the transmission is operating below third gear since the kickdown servo is in a deactuated condition at that time, and will occur rapidly in the transient situation in which the vehicle throttle is depressed rapidly toward the wide open throttle position when operating in third gear. Under the latter condition, throttle pressure in conduit 174 increases as kickdown servo pressure in conduit 148 decreases, and the valve spool 156 shifts leftward. This disengages the lock-up clutch mechanism 10 as will become clear as this operation description progresses.

With the lock-up valve 112 and the selector valve 114 in the position shown in FIG. 2, line pressure is communicated from its source 142 through passages 128 and 130, conduit 144, passages 168 and 166, and conduit 172 to the left land 178a of spool 178 to overcome the bearing force of the spring 180 and move the spool 178 to its illustrated full rightward position. When in this position, fluid at regulated pressure in conduit 204 is ported through conduit 202, passages 190 and 188, and conduit 198 to the cooler 200. Simultaneously, fluid at line pressure in conduit 172 is ported through passages 184 and 186 and conduit 196 to the annular passage 106 of torque converter portion 12, and fluid is exhausted from the input shaft bore 86 to passages 80, 74, and 72 and through conduit 206 and ports 192 and 194 to the transmission reservoir or vent (not shown).

Turning now to FIG. 1, it will be seen that the valve positioning and consequent fluid porting heretofore described results in the actuation of the lock-up mechanism 10. Fluid in the annular chamber 98 is exhausted through the bearing 51, grooves 96, and cavity 88 to the bore 86 from where it is directed to the reservoir through the switch valve 116 as described. A low pressure region forward (leftward as viewed in FIG. 1) of the piston member 58 is thus created. Concurrently, fluid at line pressure in passage 106 is delivered to the torque converter through the slots 104. As the fluid is exchanged between the turbine 38, the impeller 28, and the stator 40, pressure in the chamber 100 tends to increase as fluid from the impeller enters through the gap 102 and the chamber 100 is closed to the chamber 98 when the annular surface 64 of the piston member 58 sealingly engages the friction disc 62 of the front cover member 16. As the pressure differential between the chambers 98, 100 increases, the piston member 58 is lockingly engaged with the front cover member 16 while its driving engagement with the turbine 38 through the torsional isolation mechanism 56 is maintained. A direct rotary mechanical connection between the crankshaft 14 and the transmission input shaft 54 is therefore effected as turbine and impeller 38, 28 both turn with the front cover member 16 which is driven by the crankshaft 14 through the plate member 18 and the turbine hub member 50 drives the input shaft 54 through the spline connection 52.

Now returning to FIG. 2, upon shifting the lock-up and/or selector valve 112, 114 to the nonlock-up position under any of the conditions described above, line pressure is removed from the conduit 172, which is ported to reservoir through passages 166 and 164 of the selector valve 114. This causes the spool 178 of switch valve 116 to move to its full leftward position. When so positioned, fluid from the pressure regulator 110 is ported through conduits 204 and 202, and passages 190 and 192 of switch valve 116 to the conduit 206 whereby it is transmitted to the input shaft bore 86 by way of passages 72, 74, 80, 82, and 84. At the same time, annular passage 106 is placed in fluid communication with the cooler 200 through conduit 196, passages 186 and 188, and conduit 198.

Deactuation of the lock-up mechanism 10 from the position shown in FIG. 1 is effected when the valves of the control circuit 8 assume the positions described immediately above in the following manner. At the instant of transition from the lock-up mode, fluid at the pressure metered by the regulator 110 is fed to the bore 86 and then through cavity 88, passage 96, and bearing 51 to the chamber 98. The resulting pressure therein rises to a level slightly higher than that in the chamber 100 as relative motion between the turbine 38 and the impeller 28 begins with the lessening of functional locking force and excess fluid from that portion of the circuit is exhausted for heat exchange purposes to the conduit 196 through slots 104 and annular passage 106. The differential pressure between the chambers 98 and 100 results in sliding the piston member 58 on its associated seal 60 axially rearward (rightward as viewed in FIG. 1) along the turbine hub member 50 to a position where chambers 98 and 100 are in fluid communication and the torque converter is supplied inlet fluid along this path, thereafter operating in the conventional manner until direct drive (third gear) and vehicle speed conditions demand a shift to the lock-up mode.

Freedom is shifting the piston member between the two described positions may be enhanced by provisions of the improved seal gland configuration shown in FIG. 3 which adds compliance to the seal 60 in accommodating deflections occurring during transmission operation. In FIG. 3, it is shown that a groove 61 is formed in the inner periphery of this piston member 58 having preferably tapered sides 61a and 61b as is conventional in the sealing arts and including an outer diametral surface 61c tapering outwardly from rear to front on an angle of approximately 7°. An elastomeric sealing member such as an "O" ring 61d is installed in the groove 61 with an antifriction back-up member such as a Teflon ring 61e positioned adjacent it at the enlarged end of the groove as shown. This arrangement ensures that when the seal is pressurized such as during the lock-up mode of operation that the sealing member 61d is engaged only with the turbine hub member 50 at its inner diameter and with the antifriction back-up ring 61e. Thus, when relative rotative movement between the piston member 58 and the hub member 50 occurs by operation of the torsional isolating means 56, there is minimal resistance from the sealing components.

4. The Alternative Control Circuit

It can be appreciated by those skilled in the art that the logic imposed on the lock-up operation by the lock-up valve 112 and the selector valve 114 of the FIG. 1 embodiment might be effected by valve arrangements other than that disclosed in that embodiment. One advantageous alternative is shown in FIG. 4 wherein the lock-up valve there numbered 312 includes a single diameter spool 320 which is shifted in response only to governor pressure from the source 154 while the selector valve 114 operated as previously described. The net effect of the two valves is the same as that of the FIG. 1 embodiment; i.e., line pressure is ported to the switch valve 116 and thence to the torque converter 12 only when minimum vehicle speed in the predetermined gear ratio is reached.

While only two embodiments of the torque converter lock-up system of the present invention have been described, others may be possible without departing from the scope of the appended claims.

What is claimed is:

1. A lock-up system for a hydrokinetic torque converter assembly of a multiple gear ratio automatic transmission for a vehicle, said torque converter assembly being of the type including an annular front cover member rotatively drivingly engageable with a prime mover, impeller means carried for rotation with the cover member, and turbine means fluidly connected in driving relationship with the impeller means and drivingly engaged with the input shaft of the multiple gear ratio transmission, said lock-up system comprising:
   A. means defining a hub portion of said turbine means including diametral surface extending axially therefrom toward said front cover member;
   B. a piston member having a bore slidingly received on said diametral surface for axial movement therealong and defining a first fluid chamber adjacent said cover member and a second fluid chamber adjacent said turbine means;
   C. means defining a radially extending forwardly facing flat annular surface proximate the outer periphery of said piston member;
   D. sliding seal means carried by said piston member for engagement with said diametral surface and including:
      1. means defining an annular groove in said piston bore for receiving said seal member, said groove having an outer diametral surface tapered outward from said hub portion diametral surface in the direction of said front cover member;
      2. an elastomeric sealing member of circular cross section carried in said groove; and
      3. an antifriction back-up disc carried in said groove adajcent said sealing member;
   E. torque isolation means for drivingly interconnecting said piston member and said turbine means;
   F. a friction disc member carried by said cover member in juxtaposition with said piston member flat annular surface whereby movement of said piston member from a free position wherein said friction disc is spaced from said annular surface to a locking position wherein said friction disc lockingly engages said annular surface effects mechanical interlocking of said cover member and said input shaft; and
   G. fluid control means for circulating fluid to and from said chambers and for switching the pressure differential between said first and second chambers between;
      1. an unlocked condition wherein the fluid pressure in said first chamber exceeds the fluid pressure in said second chamber thereby positioning said piston member in said free position; and
      2. a locked condition wherein the fluid pressure in said second chamber exceeds the fluid pressure in said first chamber thereby urging said piston member to said locking position.

2. A lock-up system as defined in claim 1 wherein said friction disc substantially blocks fluid communication between said first and second chambers when said piston member is in said locking position.

3. A lock-up system as defined in claim 1 or 2 wherein said fluid control means comprises:
   A. a source of fluid at transmission line pressure;
   B. a source of fluid at transmission regulated pressure;
   C. a fluid reservoir;
   D. a fluid cooler;
   E. switch valve means operative:
      (1) in a locked condition wherein fluid is ported from said line pressure source to said second fluid chamber and from said first fluid chamber to said reservoir to effect movement of said piston member and
      (2) in an unlocked condition wherein fluid is ported from said regulated source to said first fluid chamber and from said second fluid chamber to said cooler to effect movement of said piston member to said free position;
   F. logic valve means operative to permit operation of said switch valve means in said locked condition only when:
      (1) said transmission is operated in a mode in which a predetermined gear ratio is selected, and
      (2) the speed of said vehicle is above a predetermined minimum.

4. A lock-up system as defined in claim 3 wherein said fluid control means further comprises:
   G. a source of governor pressure fluid varying in pressure with the speed of said vehicle;
   H. A source of throttle pressure fluid varying in pressure with the power output of said prime mover; and
   I. a source of kickdown servo release pressure fluid varying between
      (1) a first higher pressure when said predetermined gear ratio is selected, and
      (2) a second lower pressure when said predetermined gear ratio is not selected, and
   wherein said logic valve means comprises:
      (1) lock-up valve means in fluid communication with said governor pressure source and said kickdown servo release pressure source and operative to permit the passage of fluid from said line pressure source therethrough in response to
         i. an increase in governor pressure fluid to a value representative of said predetermined speed; and
         ii. an increase in servo actuator pressure to a value representative of selection of said predetermined gear ratio; and
      (2) selector valve means in fluid communication with said lock-up valve means, said switch valve means, said servo actuator pressure source, and said throttle pressure source and operative to port line pressure fluid from said lock-up valve means to said switch valve means when a predetermined differential exists between said throttle pressure and said kickdown servo release pressure.

5. A lock-up system as defined in claim 4 wherein said switch valve means is further operative:
  J. in said unlocked condition to port fluid from said regulated pressure source to said first fluid chamber and from said second fluid chamber to said cooler.

6. A lock-up system as defined in claim 3 wherein said fluid control means further comprises:
  K. a source of governor pressure fluid varying in pressure with the speed of said vehicle;
  L. a source of throttle pressure fluid varying in pressure with the power output of said prime mover; and
  M. a source of kickdown servo release pressure fluid varying between
    (1) a first higher pressure when said predetermined gear ratio is selected; and
    (2) a second lower pressure when said predetermined gear ratio is not selected; and
  wherein said logic valve means comprises:
    (1) lock-up valve means in fluid communication with said governor pressure source and said servo actuator pressure source and operative to permit the passage of fluid from said line pressure source therethrough in response to an increase in governor pressure fluid to a value representative of said predetermined speed; and
    (2) selector valve means in fluid communication with said lock-up valve means, said switch valve means, said servo actuator pressure source, and said throttle pressure source and operative to port line pressure fluid from said lock-up valve means to said switch valve means when a predetermined differential exists between said throttle pressure and said kickdown servo release pressure.

7. In a multiple gear ratio transmission for an engine driven vehicle, the transmission having a hydrokinetic torque converter assembly including a lock-up system wherein the mechanical interlocking of relatively rotatable parts of the torque converter assembly is effected by movement of a piston member from a free position to a locking position in response to operation of a fluid control means, an improvement wherein said fluid control means comprises:
  A. a source of fluid at transmission line pressure;
  B. a source of fluid at transmission regulated pressure;
  C. a fluid reservoir
  E. switch valve means operative
    (1) in a locked condition wherein fluid is ported from said line pressure source to one side of said piston member and from the other side of said piston member to said reservoir to effect said interlocking; and
    (2) in an unlocked condition wherein fluid is ported from said regulated source to said other side of said piston and from said one side to said cooler to discontinue said interlocking; and
  F. logic valve means operative to permit operation of said switch valve means in said locked condition only when:
    (1) said transmission is operated in a mode in which a predetermined gear ratio is selected; and
    (2) the speed of said vehicle is above a predetermined minimum.

8. The improvement as defined in claim 7 and further comprising:
  G. a source of governor pressure fluid varying in pressure directly with the speed of said vehicle;
  H. a source of throttle pressure fluid varying in pressure with the power output of said engine; and
  I. a source of kickdown servo release pressure fluid varying between
    (1) a first higher pressure when said predetermined gear ratio is selected; and
    (2) a second lower pressure when said predetermined gear ratio is not selected; and
  wherein said logic valve means comprises:
    (1) lock-up valve means in fluid communication with said governor pressure source and said servo actuator pressure source and objective to permit the passage of fluid from said line pressure source therethrough in response to
      (a) an increase in governor pressure fluid to a value representative of said predetermined speed; and
      (b) an increase in kickdown servo release pressure to a value representative of selection of said predetermined gear ratio; and
    (2) selector valve means in fluid communication with said lock-up valve means, said switch valve means, said servo actuator pressure source, and said throttle pressure source and operative to port line pressure fluid from said lock-up valve means to said switch valve means when a predetermined differential exists between said throttle pressure and said kickdown servo release pressure.

9. The improvement as defined in claim 7 and further comprising:
  J. a source of governor pressure fluid varying in pressure directly with the speed of said vehicle;
  K. a source of throttle pressure fluid varying in pressure with the power output of said engine; and
  L. a source of kickdown servo release pressure fluid varying between
    (1) a first higher pressure when said predetermined gear ratio is selected; and
    (2) a second lower pressure when said predetermined gear ratio is not selected; and
  wherein said logic valve means comprises:
    (1) lock-up valve means in fluid communication with said governor pressure source and said kickdown servo release pressure source and operative to permit the passage of fluid from said line pressure source therethrough in response to an increase in governor pressure fluid to a value representative of said predetermined speed; and
    (2) selector valve means in fluid communication with said lock-up valve means, said switch valve means, said kickdown servo release pressure source, and said throttle pressure source and operative to port line pressure fluid from said lock-up valve means to said switch valve means when a predetermined differential exists between said throttle pressure and said kickdown servo release pressure.

* * * * *